(12) United States Patent
Bonalle et al.

(10) Patent No.: US 9,208,510 B1
(45) Date of Patent: Dec. 8, 2015

(54) SYSTEMS AND METHODS FOR DIGITAL SPEND BASED TARGETING AND MEASUREMENT

(75) Inventors: David S. Bonalle, New Rochelle, NY (US); Brian C. Bender, New York, NY (US); Mehmet E. Dedeoglu, West New York, NJ (US); Rajendra R. Rane, Edison, NJ (US); Tamara F. Odinec, New York, NY (US); Patrick R. Lowery, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 286 days.

(21) Appl. No.: 13/348,432

(22) Filed: Jan. 11, 2012

Related U.S. Application Data

(63) Continuation-in-part of application No. 13/172,676, filed on Jun. 29, 2011.

(51) Int. Cl.
 *G06Q 30/02* (2012.01)
(52) U.S. Cl.
 CPC .................. *G06Q 30/0255* (2013.01)
(58) Field of Classification Search
 CPC ........ G06Q 30/0255; G06Q 30/0207–30/0277
 USPC ...................................................... 705/14.53
 See application file for complete search history.

(56) References Cited

U.S. PATENT DOCUMENTS

| | | | |
|---|---|---|---|
| 7,730,532 B1 * | 6/2010 | Yeo ................................. | 726/22 |
| 8,468,271 B1 * | 6/2013 | Panwar et al. ................. | 709/249 |
| 8,606,630 B2 * | 12/2013 | Fordyce et al. ............... | 705/14.1 |
| 8,639,567 B2 * | 1/2014 | Winters ........................ | 705/14.1 |
| 2006/0265495 A1 * | 11/2006 | Butler ............... | G06F 17/30899 709/224 |
| 2006/0282327 A1 * | 12/2006 | Neal ....................... | G06Q 30/02 705/14.53 |
| 2011/0035256 A1 * | 2/2011 | Shkedi et al. ................... | 705/10 |
| 2011/0047072 A1 * | 2/2011 | Ciurea ........................... | 705/39 |
| 2011/0093327 A1 * | 4/2011 | Fordyce et al. ............ | 705/14.39 |
| 2011/0231246 A1 * | 9/2011 | Bhatia et al. ................ | 705/14.43 |
| 2011/0231305 A1 * | 9/2011 | Winters ......................... | 705/39 |
| 2011/0313847 A1 * | 12/2011 | Cao ........................ | G06Q 30/02 705/14.43 |
| 2012/0016738 A1 | 1/2012 | Ouimet | |
| 2014/0195338 A1 * | 7/2014 | Woda ..................... | G06Q 10/00 705/14.45 |
| 2014/0351048 A1 * | 11/2014 | Fordyce et al. ............ | 705/14.53 |

OTHER PUBLICATIONS

Office Action dated Aug. 1, 2013 in U.S. Appl. No. 13/172,676.
Final Office Action dated Mar. 4, 2014 in U.S. Appl. No. 13/172,676.

(Continued)

*Primary Examiner* — David Stoltenberg
(74) *Attorney, Agent, or Firm* — Snell & Wilmer L.L.P.

(57) ABSTRACT

The present disclosure includes a system, method, and article of manufacture for spend based targeting. In various embodiments, the system may transmit, to a third party system, a spend data file associating a first party cookie ID with spend data, as well as a first party cookie ID and/or a third party cookie ID to a web client. The web client may transmit the first party cookie ID and/or the third party cookie ID to the third party system, and the third party system may generate a look alike model for targeting advertisements to the web client based on the spend data file and clickstream data associated with the web client. In various embodiments, the third party system may match the third party cookie ID with the first party cookie ID in the spend data file, which may associate a customer with a segment.

21 Claims, 16 Drawing Sheets

(56) References Cited

OTHER PUBLICATIONS

Office Action dated Nov. 7, 2013 in U.S. Appl. No. 13/348,470.
Advisory Action dated Jul. 23, 2014 in U.S. Appl. No. 13/348,470.
Final Office Action dated May 14, 2014 in U.S. Appl. No. 13/348,470.
Advisory Action dated Jun. 12, 2014 in U.S. Appl. No. 13/172,676.
Final Office Action dated Mar. 14, 2014 in U.S. Appl. No. 13/172,676.
Office Action dated May 15, 2015 in U.S. Appl. No. 13/348,470.
Office Action dated Mar. 25, 2015 in U.S. Appl. No. 13/172,676.

* cited by examiner

| First Party Cookie ID | Model |
|---|---|
| ad7ec2198374f7a7acf1db700bb318aa | 0111000000000000001000010000000110010000000001000 |
| 8c257e7f45645b73b91dcc3b2119155b | 0111100000000000000000000000000000000100000000000 |
| 31f14f746c4f8ffef40baafdfdabea21 | 0010000000000000000000000000000000000000000000000 |

FIG. 4

| Third Party Cookie | Match | Model (50) | Measurement (488) | Browsing Behavior | Time Stamp |
|---|---|---|---|---|---|
| 1234 | Yes | 01110... | 000... | Segment 2, Segment 3, Segment 4 | July 15 2010 10:55:20 |
| 1234 | Yes | 01110... | 000... | Segment 2, Segment 3, Segment 5 | July 16 2010 00:01:30 |
| 1234 | Yes | 01110... | 000... | Segment 2, Segment 3, Segment 6 | July 16 2010 00:02:00 |
| 8888 | No | | | Segment 5 | July 15 2010 13:11:21 |
| 9012 | Yes | 01110... | 000... | Segment 3 | July 15 2010 20:14:10 |

FIG. 5

| Priority | Model | Advertiser(s) |
|---|---|---|
| 1 | passion_cruise | Cruise operator 1 |
| 1 | passion_lodging | Cruise operator 2 |
| 1 | passion_fashion | Clothing retailer 1 |
| 1 | Retail_Spender | Clothing retailer 2 |
| 1 | passion_entertainment | Lodging institution |
| 1 | val_hfrnshng | Home improvement store 1 |
| 1 | passion_home_improvement | Home improvement store 2 |

FIG. 7

| Tier Name | Logic |
|---|---|
| RCC0301 | (H07710_10458 AND NOT (G07610_50366) AND NOT (A06544_50149) AND NOT (G07610_50540) AND NOT (E08745_50135)) OR H07710_10472 |
| RCC0302 | (NOT(H07710_10458) AND NOT (07610_50636) AND NOT (E08745_50135) AND G07610_10122 |
| RCC0303 | NOT(H07710_10458) AND NOT (G07610_50636) AND NOT (E08745_50135) AND NOT (G07610_10122) AND NOT (H07707_50605) |
| RCC0304 | H07710_10458 AND NOT (G07610_50366) AND NOT (A06544_50149) AND NOT (G07610_50540) AND E08745_50135 |
| RCC0305 | H07710_10458 AND NOT (G07610_50366) AND A06544_50149 |
| RCC0306 | NOT(H07710_10458) AND G07610_50636 AND G07610_10347 |
| RCC0307 | H07710_10458 AND G07610_50366 |

FIG. 8

Measurement File

| First Party Cookie ID | Advertiser 1 | | Advertiser 2 | | Advertiser 3 | |
|---|---|---|---|---|---|---|
| | Spend | Transactions | Spend | Transactions | Spend | Transactions |
| ad7ec2198374f7a7acf1db700bb318aa | $ | # | $ | # | $ | # |
| 8c25737f45645b73b91dcc3b2119155b | $ | # | $ | # | $ | # |
| 31f14f746c4f8ffef40baafdfdabea21 | $ | # | $ | # | $ | # |

FIG. 11

Updated Measurement File

| Third Party Cookie ID | Measurement | | | | | | | Exposed | | | Time Stamp |
|---|---|---|---|---|---|---|---|---|---|---|---|
| | Advertiser 1 | | Advertiser 2 | | Advertiser 3 | | Advertiser 1 | Advertiser 2 | Advertiser 3 | |
| | Spend | Transactions | Spend | Transactions | Spend | Transactions | | | | |
| 1234 | $ | # | $ | # | $ | # | Y | N | Y | Sep 16 2010 07:15:00 |
| 2345 | $ | # | $ | # | $ | # | Y | Y | N | Sep 18 2010 11:10:36 |
| 3456 | $ | # | $ | # | $ | # | N | N | Y | Sep 20 2010 04:56:01 |

FIG. 12

SYSTEMS AND METHODS FOR DIGITAL SPEND BASED TARGETING AND MEASUREMENT

CROSS REFERENCE TO RELATED APPLICATIONS

This application is a continuation in part of, and claims priority to and the benefit of, U.S. Ser. No. 13/172,676, filed on Jun. 29, 2011 and entitled "SYSTEMS AND METHODS FOR DIGITAL SPEND BASED TARGETING AND MEASUREMENT," which is incorporated by reference herein in its entirety.

BACKGROUND

1. Field

The present disclosure generally relates to customer information management, and more particularly, to methods, systems, and articles of manufacture for targeting advertisements to customers based upon spend and/or browsing behavior, and measuring the effectiveness and relevance of those advertisements.

2. Related Art

Businesses frequently store a variety of information relating to the interests and activities of their customers. For example, transaction account companies (e.g., American Express, Visa, Discover, etc) typically maintain information about the purchasing habits and/or product affinities of their customers. Transaction account issuing companies and payment processors may use this information to target advertisements, promotional offers, discounts, and the like to their customers. Thus, the information that transaction account companies collect about their customers enables a more relevant provisioning of services to customers.

Although transaction account companies and payment processors often have access to a variety of purchasing information, many of these businesses suffer a dearth of information insofar as they are unable to incorporate into their marketing efforts data associated with the shopping (e.g., web-browsing) activities of their customers. In other words, transaction account companies and payment processors are limited in their efforts to provide relevant and useful offers and services to customers, due to their incomplete picture of the interests of their customers.

An improved system for understanding their customers is needed. This system should permit transaction account companies to target marketing and other promotional offers to customers based on the purchasing activities of those customers, and on the shopping/web-browsing activities of those customers. The system should further permit transaction account companies to measure the success and value of the system, particularly from a customer's standpoint. In other words, the system should incorporate an ability to evaluate the actual relevance of the advertisements, offers, promotions, and discounts offered by the system to customers.

Finally, the system should seek to preserve the privacy of the customers it aims to serve. To this end, the system should incorporate one or more methods for maintaining the anonymity of customers.

SUMMARY

The present disclosure includes a system, method, and article of manufacture for spend based targeting. In various embodiments, the system may transmit, to a third party system, a spend data file associating a first party cookie ID with spend data, as well as a first party cookie ID and/or a third party cookie ID to a web client. The web client may transmit the first party cookie ID and/or the third party cookie ID to the third party system, and the third party system may generate a look alike model for targeting advertisements to the web client based on the spend data file and/or clickstream data associated with the web client. In various embodiments, the third party system may match the third party cookie ID with the first party cookie ID in the spend data file, which may associate a customer with a segment. A second party system may transmit the clickstream data to the third party system in response to a visit by the web client to a website, and the third party system may receive clickstream data from a second party system in association with the third party cookie ID. Further, in various embodiments, a second party system may serve targeted advertisements to the web client based on the look alike model, and the system may transmit to the third party system an updated spend data file based on updated spend data associated with a customer.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

FIG. 4 shows an exemplary model file in accordance with various embodiments.

FIG. 5 shows an exemplary updated model file in accordance with various embodiments.

FIG. 7 shows an exemplary advertiser model file in accordance with various embodiments.

FIG. 8 shows an exemplary model logic file in accordance with various embodiments.

FIG. 11 shows an exemplary measurement file in accordance with various embodiments.

FIG. 12 shows an exemplary updated measurement file in accordance with various embodiments.

DETAILED DESCRIPTION

Figure 1:
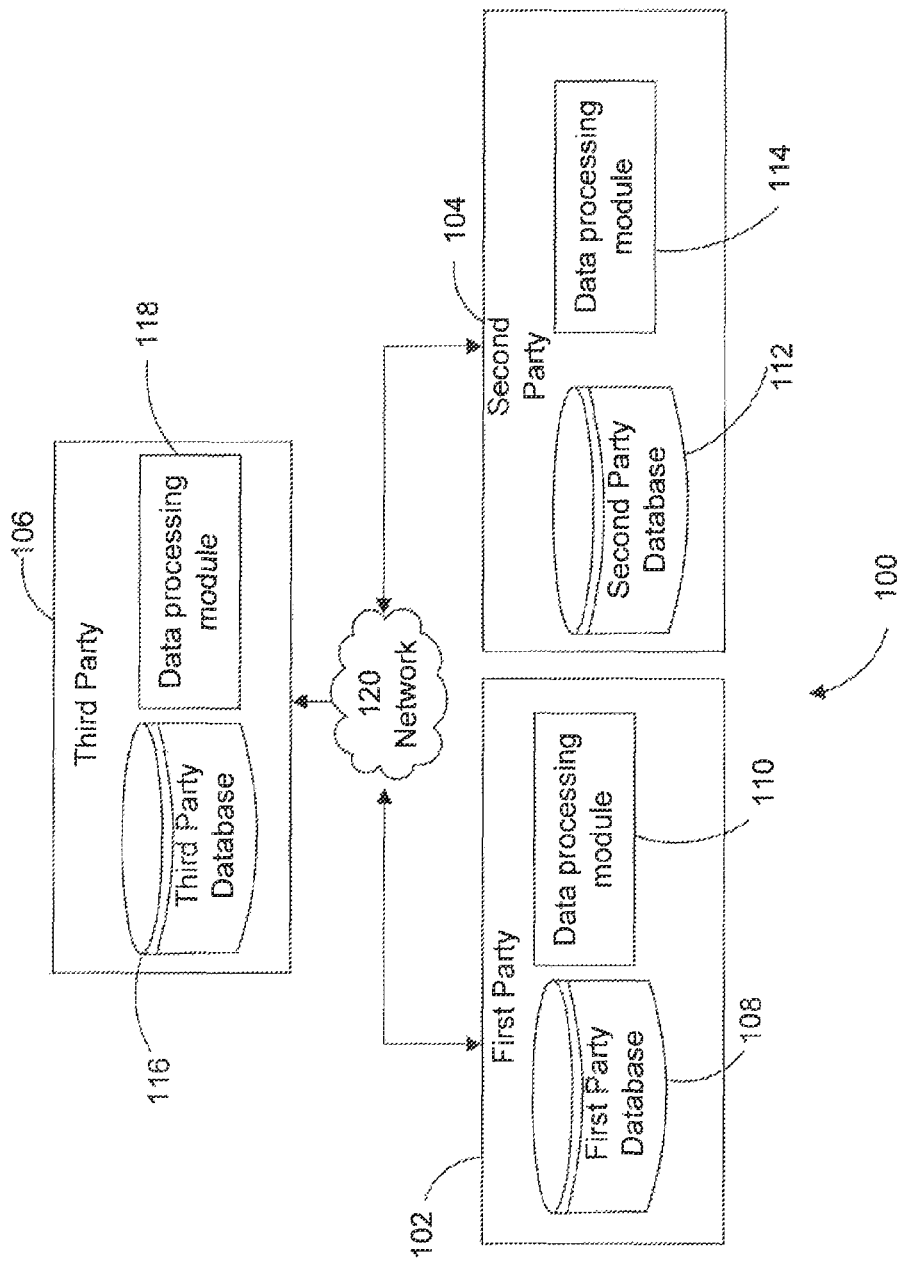
FIG. 1 shows an exemplary system diagram in accordance with various embodiments.
Figure 2A:
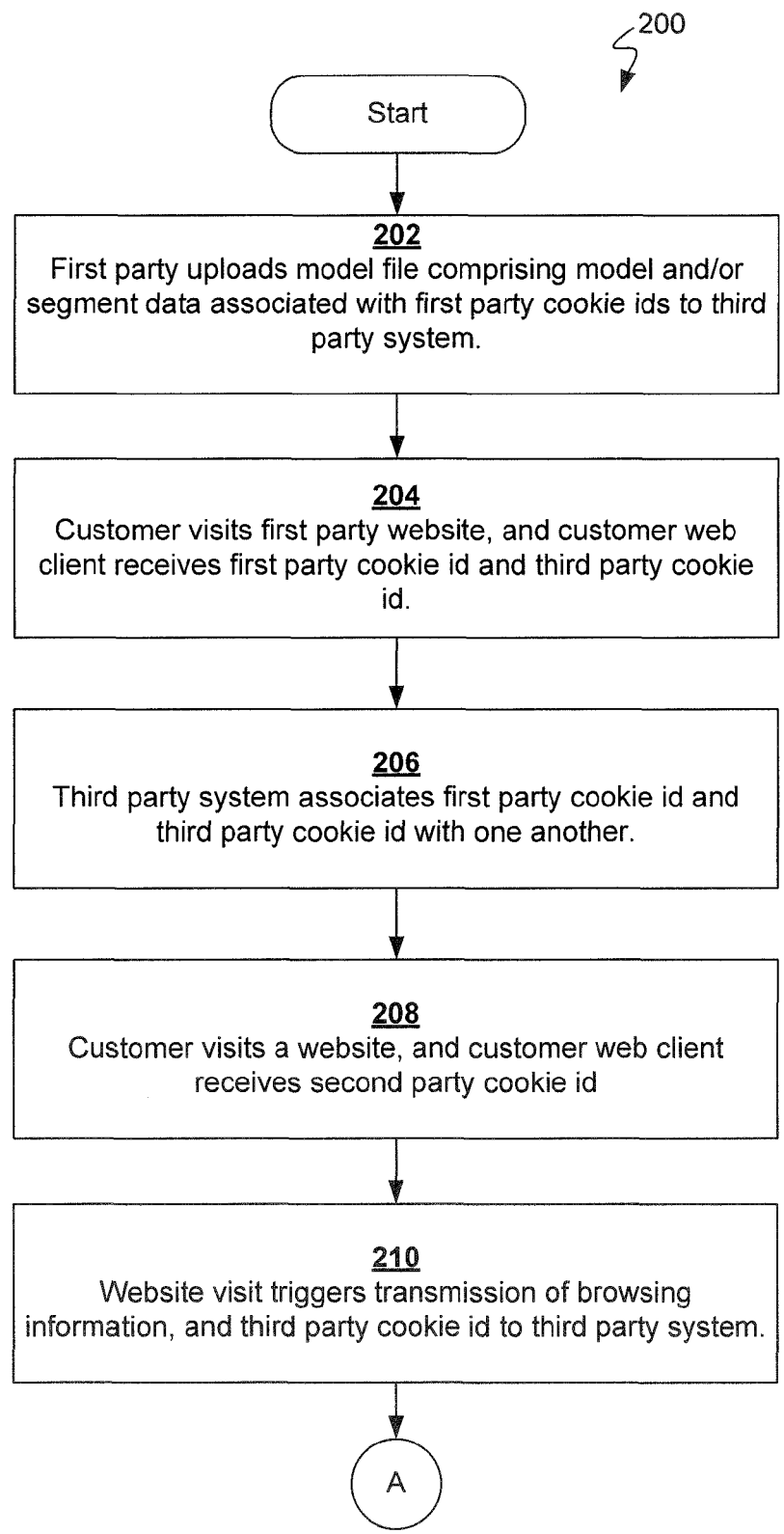
FIGS. 2A and 2B show a flowchart depicting an exemplary process for collecting anonymous data about the shopping habits and preferences of customers in accordance with various embodiments.
Figure 2B:
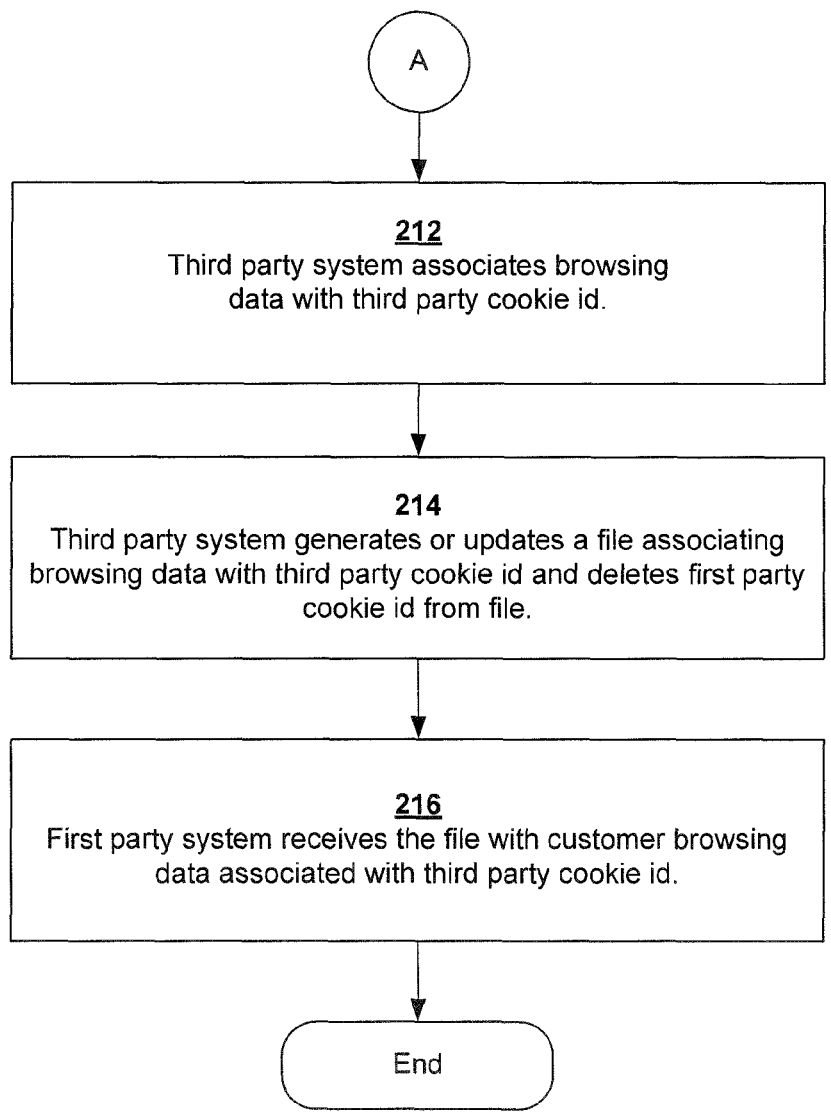

The detailed description of exemplary embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Phrases and terms similar to an "entity" or "party" may include any individual, consumer, customer, group, business, organization, government entity, transaction account issuer or processor (e.g., credit, charge, etc), merchant, consortium of merchants, account holder, charitable organization, software, hardware, and/or any other type of entity or party.

The terms "user," "purchaser," "customer," and/or the plural form of these terms are used interchangeably throughout herein to refer to those persons or entities that are alleged to be authorized to use a transaction account.

The term "consumer" and/or the plural form of this term is used herein to refer to all persons or entities. The term "consumer" includes users, purchasers, customers, etc., but also includes person or entities that are not alleged to be authorized to use a transaction account.

Phrases and terms similar to "transaction account" may include any account that may be used to facilitate a transaction (e.g., financial transaction).

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument and/or an account.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases and terms similar to "cookie," "HTTP cookie," "web cookie," "browser cookie" and the like describe one or more files or compilations of data transmitted by a website or web-server to a destination machine (e.g., a web client). Cookies may comprise a variety of data, including state data, session data, shopping cart data, customer preference data, and the like. A cookie may be stored by a customer's web client and returned later to the website or web-server with which the cookie originated (i.e., the website or web-server that set the cookie). A cookie may also be transmitted to a non-originating website or web-server (i.e., a website or web server that did not set the cookie).

Further, as used herein, a cookie may contain a "cookie ID." A cookie ID may comprise any data that uniquely identifies a user/customer/web client. Thus, a cookie ID may comprise a number, an alphanumeric string, a purely alphabetical string, a single character, and/or any other data element or compilation that may be used to uniquely identify a user/customer/web client. A cookie ID may further serve to anonymously identify a user/customer/web client, in which case the cookie ID may not contain any personally identifying information ("PII") associated with the user/customer/web client.

Further still, as used herein, the terms "first party cookie" or "first party cookie ID" may designate a cookie or cookie ID issued by, set by, and/or originating with a first party. As used herein, a "first party" may comprise any entity such as a payment processor and/or transaction account issuer (e.g., American Express, Visa, Mastercard, and the like). A first party cookie ID may identify a particular transaction account customer to a first party transaction account issuer. Similarly, the terms "second party cookie" or "second party cookie ID" may designate a cookie or cookie ID issued/set/originating with a second party. As used herein, a "second party" may comprise an advertising network or "ad network." Finally, the terms "third party cookie" or a "third party cookie ID" may designate a cookie or cookie ID issued/set/originating with a third party. As used herein, a "third party" may comprise a data processing service or "middle man."

A system for spend based targeting and measurement is disclosed. In one exemplary embodiment, a system for targeting marketing to a consumer based on the consumer's purchasing activity and/or the consumer's shopping or web-browsing activity is disclosed. Referring to FIG. 1, an exemplary system 100 for spend based targeting and measurement is disclosed. System 100 may comprise a first party system 102, a second party system 104, and a third party system 106. First party system 102 may belong to a first party and may comprise a first party database 108 and/or a data processing module 110. Second party system 104 may belong to a second party and may likewise comprise a second party database 112 and/or a data processing module 114. Third party system 106 may belong to a third party or "middle man" and may, similarly, comprise a third party database 116 and/or a data processing module 118. Data processing modules 110, 114, and/or 118 may comprise one or more computer processors for processing digital data.

First party system 102, second party system 104, and third party system 106 may communicate via network 120. As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

Referring now to FIGS. 2-10, the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-10, but also to the various system components as described above with reference to FIG. 1.

Figure 3:
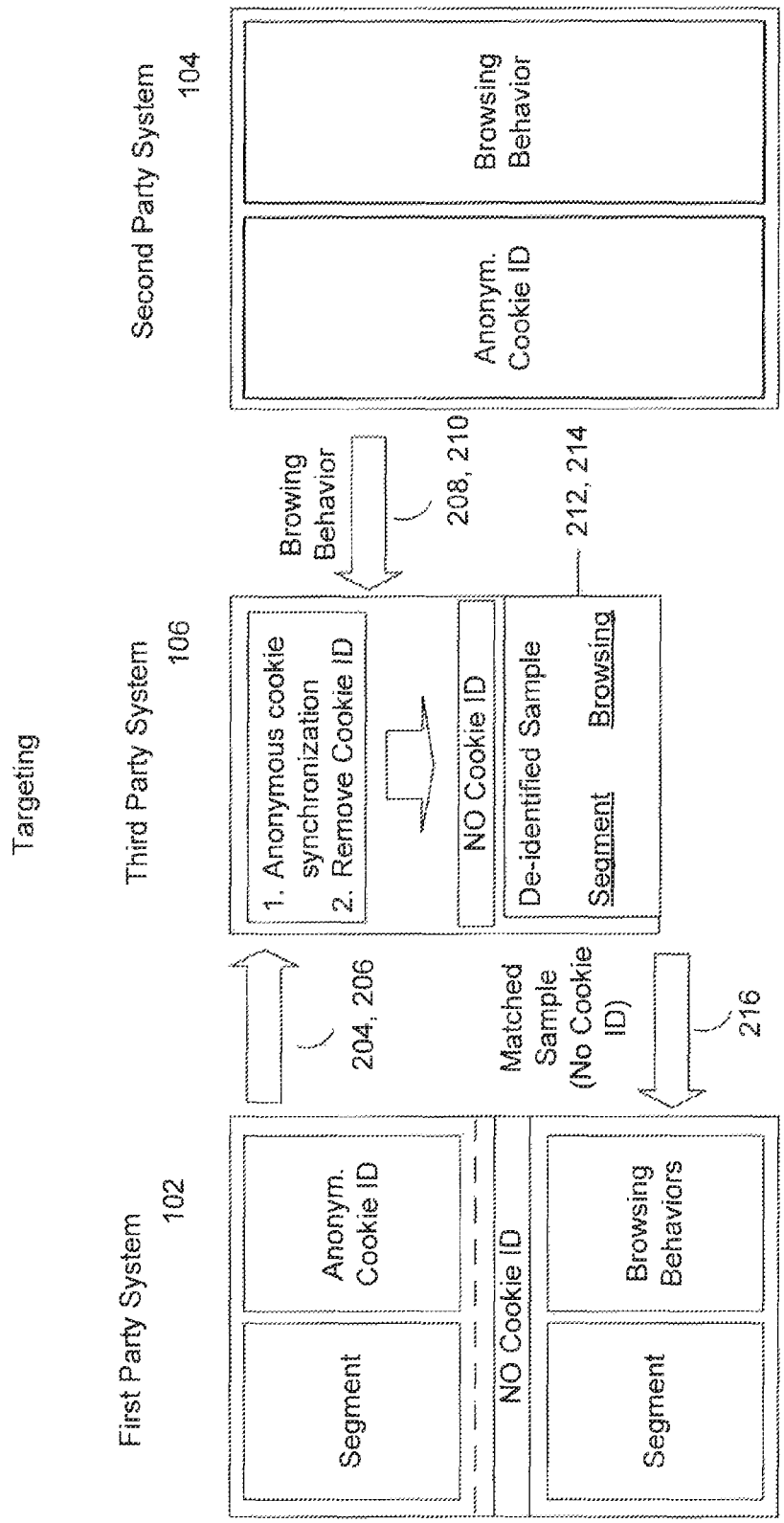
FIG. 3 shows a system diagram incorporating a process for collecting anonymous data about the shopping habits and preferences of customers in accordance with various embodiments.

With reference to FIGS. 2 and 3, a process 200 for collecting anonymous data about the shopping habits and preferences of customers and/or consumers is disclosed. A first party (e.g., a transaction account issuer) may upload to third party system 106 a file (e.g., a "model file") containing a list of first party cookie IDs linked to one or more "models" and/or one or more "segments" or "industries" (step 202). More particularly, a customer may be assigned a model based, all or in part, on the customer's purchasing activity or "spend." Spend data may comprise internal data, or data maintained by the first party about the customer. Thus, for example, a customer who often purchases a particular item or type of item (e.g., clothing, vehicle accessories, travel tickets etc.) may be associated with a "passion" model (e.g. a "fashion passionate" model, a "vehicle passionate" model, a "travel passionate" model, respectively). Likewise, a customer who often purchases only luxury items and/or items perceived to be discounted may be associated with a "luxury" model and/or a "value" model, respectively. In addition to the few exemplary models described here, a variety of other models may be constructed.

A segment or industry may comprise a category of item or items in which a customer is or may be interested. A variety of data may be organized in segments, including, a customer's shopping preferences, shopping history, and/or web-browsing activity. Thus, for illustration, segments may include, "auto," "cruise," "home furnishings," "lodging," and/or "fashion" (not shown), and a customer's shopping preferences/history, and/or browsing activity may be categorized according to these definitions.

A segment may be related to a model in that a customer may be associated with one or more models as well as one or more segments. For example, a customer may be associated with a fashion passionate model and fashion and jewelry segments, while a customer who is associated with a travel passionate model may be associated with cruise, auto, and lodging segments. Thus, in an embodiment, the segments with which a customer is associated may define, govern, and/or inform a model to which a customer is assigned.

An exemplary model file 400 is depicted at FIG. 4. As illustrated, model file 400 comprises a list 402 of first party cookie IDs, where each first party cookie ID in the list 402 is associated with one or more models 404. Models 404 may be represented, as depicted, in a binary format. However, models 404 may also appear in model file 400 in a variety of other representations, including in a model name format (e.g., "fashion passionate," etc.) Further, although not depicted, a model file may also associate one or more first party cookie IDs with one or more segments.

With continuing reference to FIGS. 2 and 3, a customer or consumer may visit a first party website (step 204). In response, a customer web client may receive a first party cookie ID and a third party cookie ID (step 204), and third party system 106 may associate the customer's first party cookie ID (which may identify the customer to the first party) with the third party cookie ID (which may not identify the customer to the first party) (step 206).

Having received a first party cookie ID and a third party cookie ID, a customer may visit a website (e.g., a commercial website, such as CNN.com) (step 208). In response, the customer web client may receive from the second party system 104 a second party cookie ID (step 208). Further, in response to this website visit, the second party system 104 may transmit browsing data associated with the customer web client and/or the third party cookie ID to the third party system 106 (step 210).

In response to receiving the browsing data and/or third party cookie ID, third party system 106 may associate the browsing data with the third party cookie ID (step 212). This association may be accomplished by way of a flat file and/or third party database 116. For example, third party system 106 may generate or update the model file such that the browsing data is associated with the third party cookie ID (step 214). Third party system 106 may further drop or delete the first party cookie ID from the model file (step 214). An exemplary compiled/updated model file is depicted at FIG. 5.

Having compiled/updated the model file with the data provided by second party system 104, third party system 106 may transmit the compiled/updated model file to first party system 102 (step 216). Further, because, in this example, third party system 106 has removed the first party cookie ID from the model file, first party system 102 may not at this point use this model file to identify its customers. Rather, each customer is uniquely identified by the third party cookie ID, which first party system 102 is unable to tie to any of its customers (because first party system 102 did not set the third party cookie ID). This arrangement of data serves, first, to shield the identity of each of the first party's customers from the first party. Likewise, the third party, although it may possess an original model file containing first party cookie IDs that are tied to third party cookie IDs, is unable to tie this data to any customer PII/purchasing data, because only the first party is privy to such information. Thus, system 100 operates to protect the privacy of the first party's customers.

In addition, first party system 102 may utilize the compiled/updated model file to associate a recent browsing behavior (which may be organized by segment) with a customer's model. In this way, first party system 102 may determine to which segments a customer associated with a particular model is likely to browse and/or has recently browsed. For example, first party system 102 may determine that a customer associated with the fashion passionate model has recently browsed to websites A, B, C, and D (e.g., Banana Republic®, Gap®, Lowes®, and Old Navy®), and/or that a customer who has browsed to websites A, B, and C is likely a fashion passionate customer.

Thus, system 100 may permit a first party to associate a customer with a model based on actual spend of the customer. System 100 may further permit a first party to receive, through interactions with second and third parties, browsing data associated with the customer. This browsing data may be "de-identified" or stripped of a first party cookie ID, such that the first party is unable to associate the customer's browsing activity with the customer's spend data and/or PII. First party system 102 may process a customer's browsing data (which may be segmented or classified according to industry) together with the customer's model information to determine a browsing behavior associated with the customer's model(s). This determination may yield a look alike targeting model, as described below.

Figure 6:
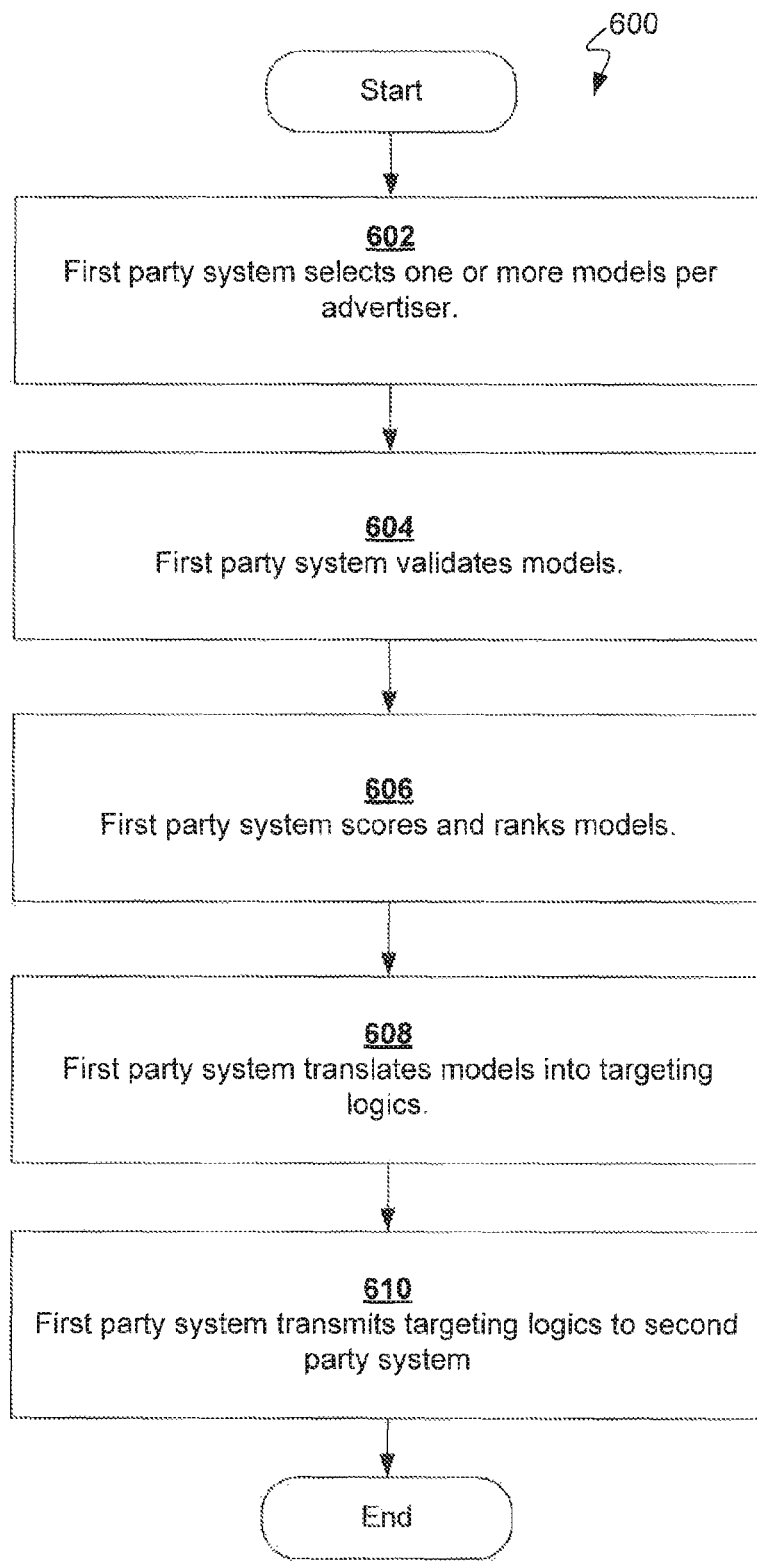
FIG. 6 shows a flowchart depicting an exemplary process for targeting advertisements to consumers in accordance with various embodiments.

Referring now to FIG. 6, a process 600 for targeting advertisements to a consumer is disclosed. First party system 102 may select, based upon a model file and/or a compiled/updated model file, one or more models (e.g., fashion passionate, luxury passionate, etc.) for each advertiser in a group of advertisers (step 602). That is, for example, and with reference to FIG. 7, the advertiser Cruise Operator may be associated with a passion cruise model and a passion lodging model. Similarly, the advertiser Clothing Retailer may be associated with a fashion passionate model and a retail spender model. Likewise, the advertiser Lodging Institution may be associated with a passion lodging model and a passion entertainment model, while the advertiser Home Improvement Store may be associated with a value home furnishings model and a home improvement passionate model.

The first party system 102 may further develop one or more look alike models based on browsing behavior data associated with the models selected in step 602 and validate one or models (step 604). Model validation may be performed at any time, but in an embodiment, validation is performed after advertisers are associated with one or more models, as described above. First party system 102 may further score and rank models (step 606).

First party system 102 may, in addition, translate one or more models into one or more targeting logics (step 608), and these targeting logics may comprise look alike models. That is, first party system 102 may translate the one or more segments defining a model (see above) into targeting logic. For instance, where a lodging passionate look alike model is defined in terms of the following segments, the look alike model may be translated as depicted at FIG. 8. The exemplary lodging passionate look alike model segments are: visits vacation sites, interested in luxury related content, sports enthusiast, small business, not a shopper, not browsing entertainment sites, not a New Yorker, and/or not interested in Asian imported cars. As illustrated, first party system 102 may translate each segment defining a model into a Boolean string, comprising one or more Boolean operators (e.g., AND, AND NOT, OR, etc.)

First party system 102 may further transmit one or more targeting logics and/or one or more look alike models to second party system 104 (step 610). Second party system 104 may track a consumer's browsing activity via a second party cookie/second party cookie ID, and, where the consumer's browsing activity meets the criteria associated with one or more of the targeting logics/look alike models, second party system 104 may deliver a targeted advertisement to the consumer. More particularly, where a consumer's browsing activity meets criteria associated with a passion cruise and/or passion lodging look alike model, for example, second party system 104 may deliver a Cruise Operator advertisement to the consumer's web client. Similarly, where a consumer's browsing activity meets criteria associated with a fashion passionate and/or a retail spender look alike model, second party system 104 may deliver, for example, a Clothing Retailer advertisement to the consumer's web client. Likewise, where a consumer's browsing activity meets criteria associated with a lodging and/or passion entertainment look alike model, second party system 104 may deliver, for example, a Lodging Institution advertisement to the consumer's web client.

Thus, a consumer's browsing activity may fit into one or more segments (or look like/fit into the segments comprising one or more models), and second party system 104 may target one or more advertisements to a consumer based upon the segments into which the consumer's browsing fits. The advertisements, as described above, may be delivered from advertisers based upon the one or more look alike models assigned to each advertiser (e.g., advertisers assigned the fashion passionate model may have their advertisements delivered to consumer's whose browsing activity meets the fashion passionate look alike model logic).

Figure 9:
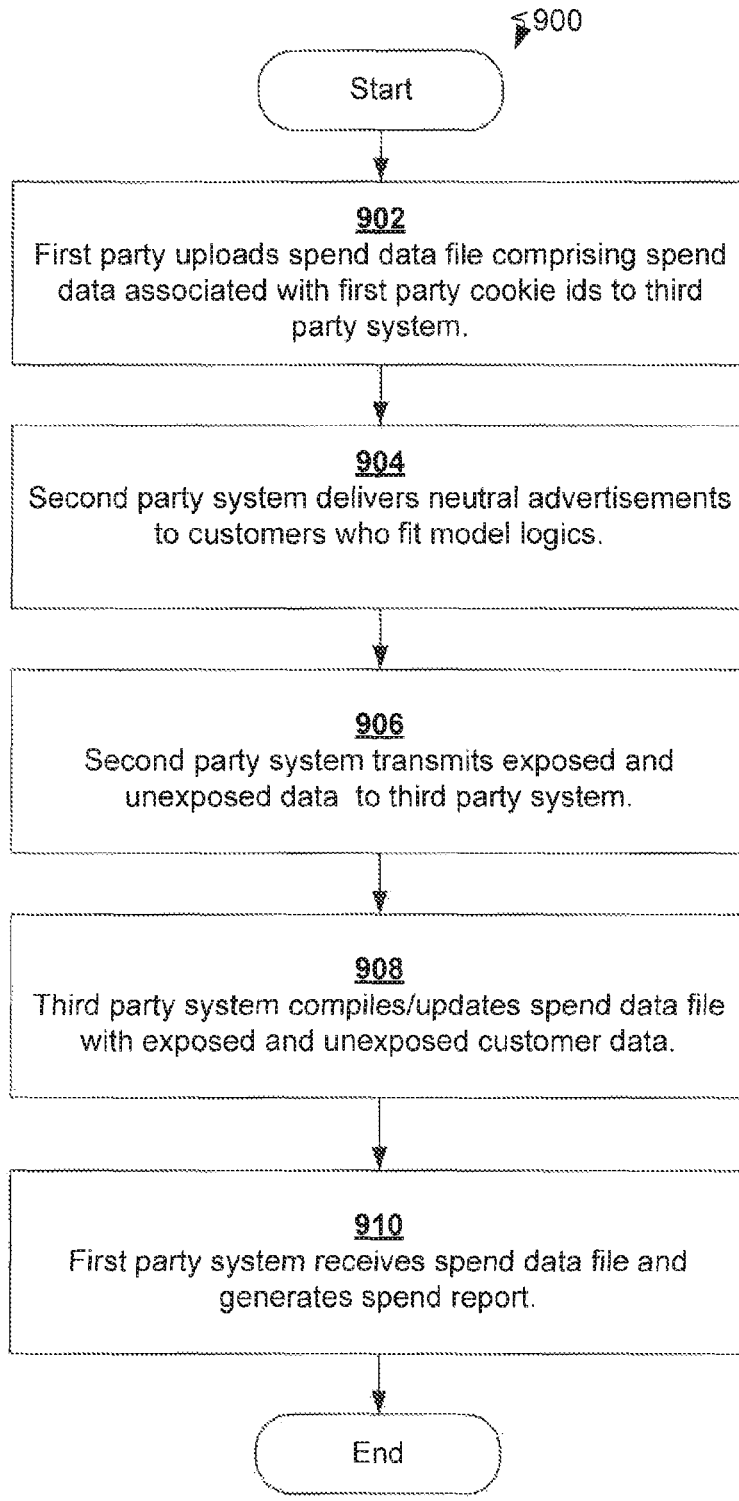
FIG. 9 shows a flowchart depicting an exemplary process for measuring the effectiveness/relevance of advertisements delivered to customers in accordance with various embodiments.
Figure 10:
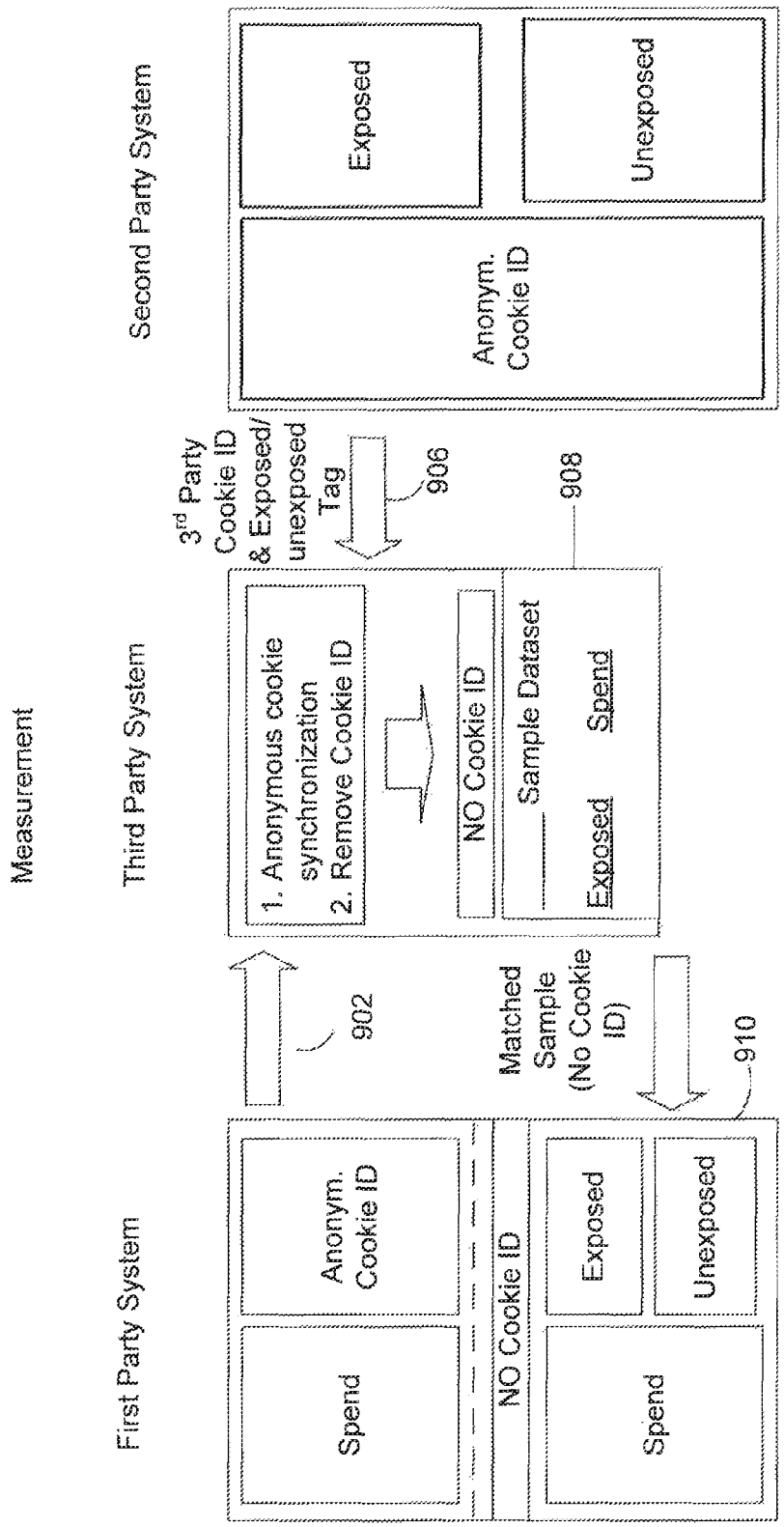
FIG. 10 shows a system diagram incorporating a process for measuring the effectiveness of advertisements targeted to customers in accordance with various embodiments.

Referring now to FIGS. 9 and 10, a process 900 for measuring the effectiveness/relevance of advertisements delivered to customers/consumers is disclosed. Broadly, process 900 is similar to process 200, with the distinction that, for measurement purposes, the first party system 102 uploads to the third party system 106 a measurement file as opposed to a model file. An exemplary measurement file 1100 is shown in FIG. 11, and, as illustrated, may include a first party cookie ID field 1102, spend data and number of transactions for a first advertiser 1104, a spend and number of transactions for a second advertiser 1106, a spend and number of transactions for a third advertiser 1108, and so on. Spend data may comprise an amount spent by a customer with a particular merchant/advertiser. Spend data may further be organized according to a period of time. Thus, for example, a measurement file may indicate that a particular customer spent $100 with advertiser 1 during the month of October 2011. Further, an exemplary measurement file 1100 may indicate that the customer spent the specified amount (e.g., $100) with the particular advertiser over the course of a number of transactions (e.g., 3 transactions, one for $20 on a first date, one for $10 on a second date, and one for $70 on a third date).

Thus, for example, first party system 102 may upload a measurement file 1100 comprising spend data associated with one or more first party cookie IDs (which are in turn associated with customers) to third party system 106 (step 902). A customer may visit a first party website, and the customer web client may receive a first party cookie ID and/or a third party cookie ID (step 904). Third party system may, as described above with reference to FIGS. 2A and 2B, associate each first party cookie ID with a third party cookie ID (step 906). Further, each time a customer visits a website, the customer's browsing activity and third party cookie ID may be transmitted to third party system 106 as described above. In other words, each time a customer visits a website, second party system 104 may deliver, in addition to targeted advertisements as described above, neutral advertisements to customers who, nevertheless, fit one or more look alike model logics (step 908). In addition, a customer web client may receive a second party cookie ID in response to visiting a website (step 910). Thus, for example, second party system 104 may monitor a customer's browsing activity such that, at a certain point, a targeting logic stored by second party system 104 would suggest or identify a particular targeted advertisement. However, second party system 104 may decline to offer this advertisement to the customer and instead present a neutral advertisement in which case the customer falls into a category of unexposed customers. Second party system may transmit exposed customer data (i.e., those customers who fit a look alike model logic and are exposed to a targeted advertisement) and unexposed customer data (i.e., those who fit a look alike model logic and are presented a neutral advertisement) to third party system 106 (step 912). Second party system and/or the website may additionally transmit a third party cookie ID to the third party system 106 (step 912). Third party system 106 may, in response to receiving exposed customer data, unexposed customer data, and/or a third party cookie ID, associate the exposed and/or unexposed customer data with the third party cookie ID (step 914). Third party system may, in addition, update the measurement file to associate the exposed and unexposed customer data with the spend data and/or third party cookie ID comprising the measurement file (step 916). Third party system may further delete the first party cookie ID from the (updated) measurement file (step 916). The first party system 102 may receive the updated measurement file and generate a spend report based thereupon (step 918).

An exemplary updated measurement file 1200 is shown at FIG. 12. As shown, an updated measurement file 1200 may comprise a third party cookie ID field 1202, as well as the spend data and number of transactions for a first advertiser 1104, the spend and number of transactions for a second advertiser 1106, the spend and number of transactions for a third advertiser 1108, and so on. An updated measurement file may further comprise one or more exposure fields 1204, 1206, 1208, etc. indicating, for each third party cookie ID, whether the customer associated with the third party cookie ID was exposed to an advertisement associated with each advertiser comprising the measurement file. In addition, an updated measurement file may include a timestamp 1210 with each exposure instance. That is, the time(s) a customer is exposed to an advertisement may be logged via a timestamp in an updated measurement file.

Figure 13:
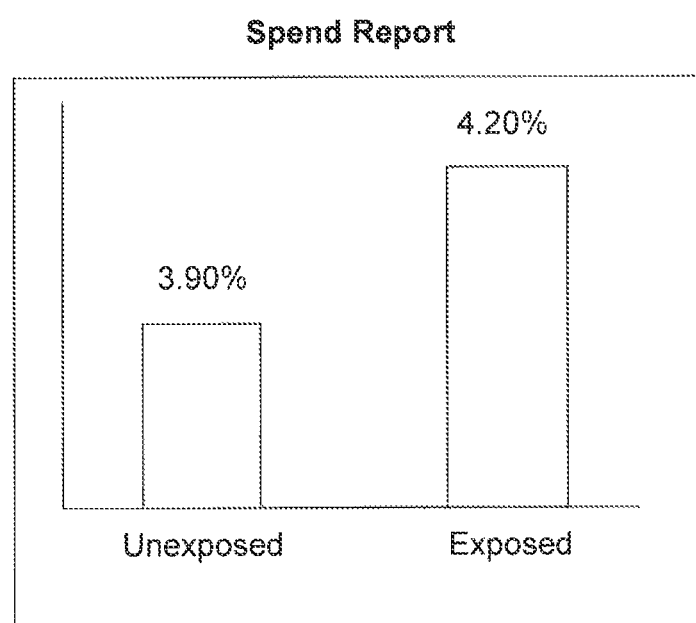
FIG. 13 shows an exemplary spend report in accordance with various embodiments.

Accordingly, first party system 102 may receive the compiled/updated measurement file and, based upon the exposed and unexposed customer data, generate a spend report showing, for example, the percentage or number of exposed customers who purchased from an advertiser and the percentage or number of unexposed customers who purchased from an advertiser (step 910). An exemplary spend report is illustrated at FIG. 13.

Thus, system 100 may permit a first party to track or measure an effectiveness of targeted advertisements. That is, system 100 may permit a first party to measure the relevance, to its customers, of the advertisements it delivers to its customers. As the number of purchases by an exposed customer population increases, particularly in contrast to the number of purchases by an unexposed population, a first party may observe the effectiveness/relevance (or lack thereof, if the number of purchases are roughly similar or if the number of unexposed customer purchases exceeds the number of exposed customer purchases) of the advertisements targeted to customers by system 100. System 100 may therefore permit advertisers to measure the actual effectiveness, in terms of sales, of their advertisements.

Figure 14A:
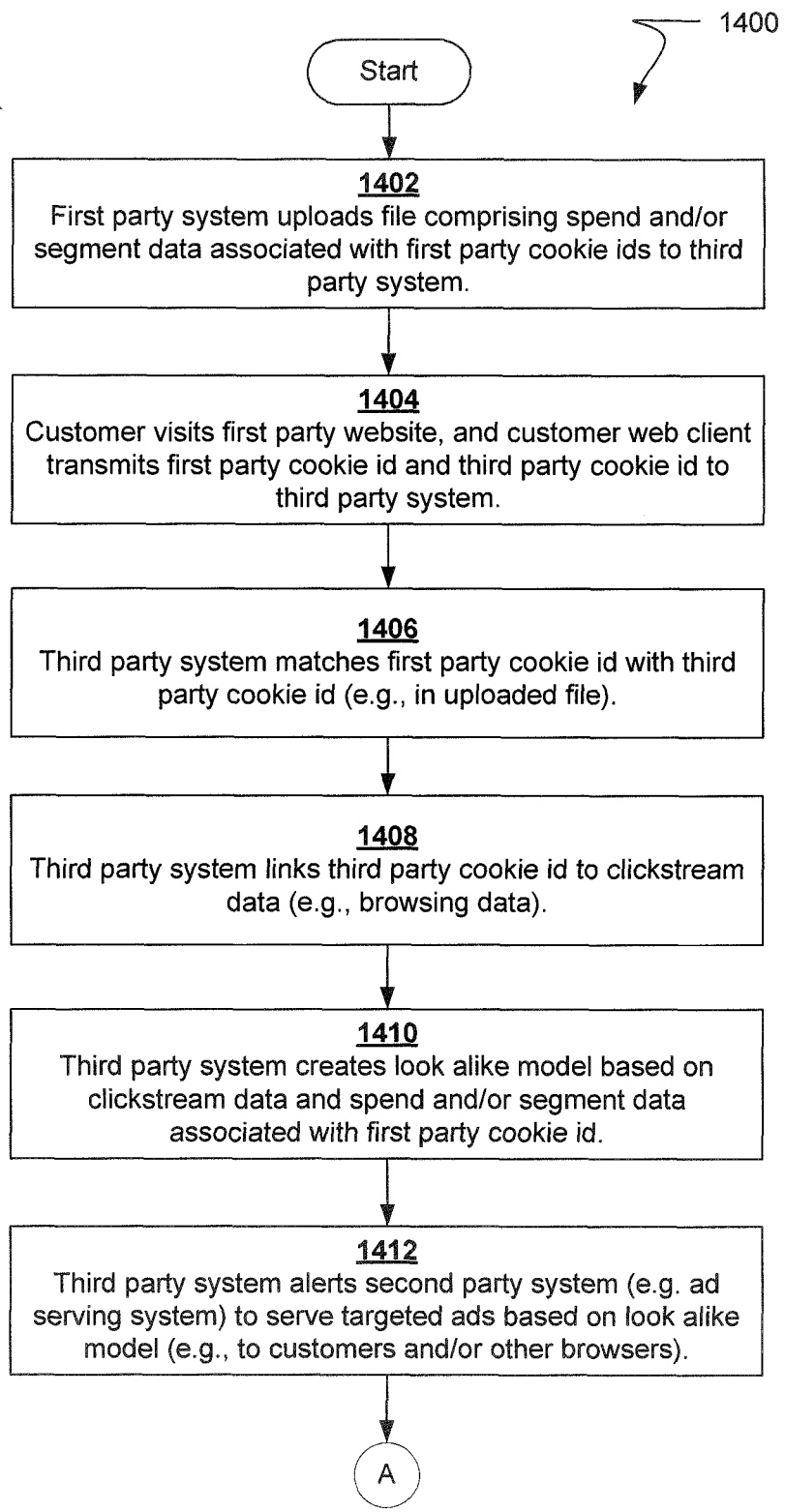
FIGS. 14A and 14B show a flowchart depicting an exemplary process for targeting advertisements and measuring the effectiveness of advertisements in accordance with various embodiments.
Figure 14B:
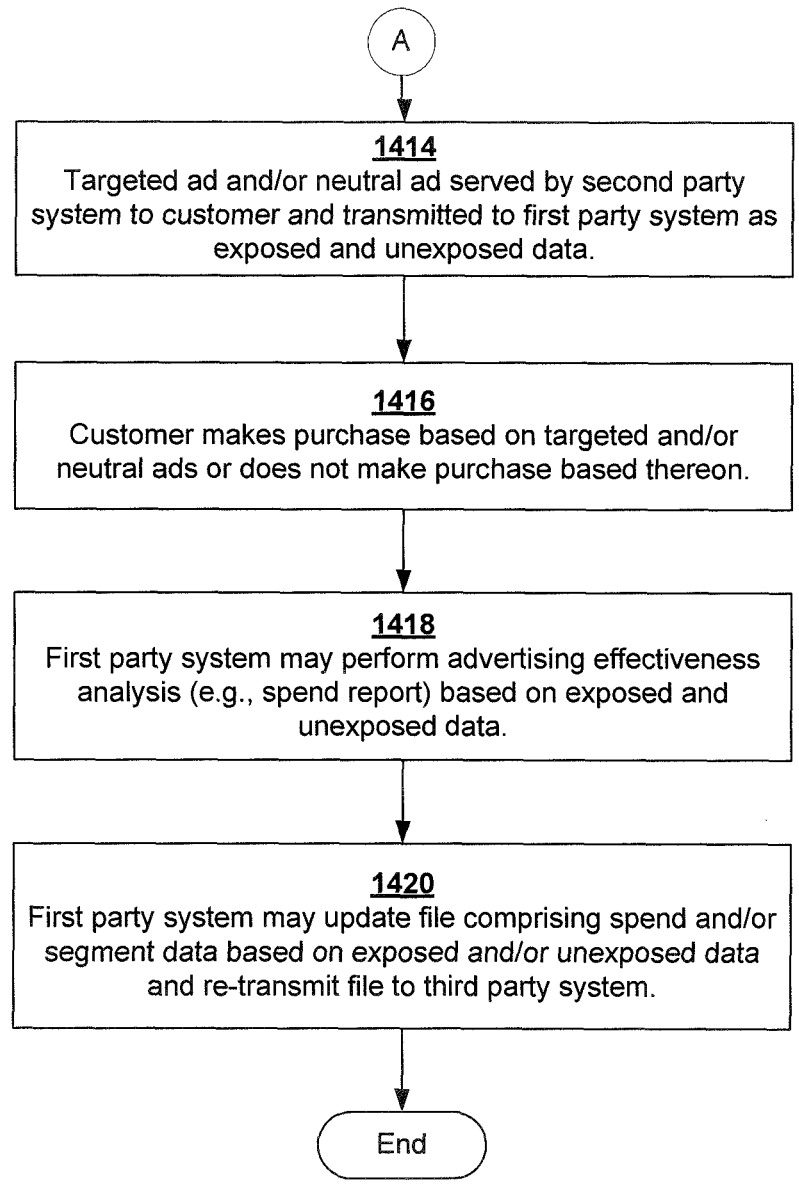

With reference now to FIGS. 14A and 14B, a process 1400 for targeting advertisements and/or measuring the effectiveness of advertising is shown. Process 1400 may resemble, in many ways, the processes described elsewhere herein. Process 1400 may further utilize and/or be performed using the systems described elsewhere herein. However, in certain aspects, as described below, process 1400 may differ from the processes described elsewhere herein.

Thus, in various embodiments, a first party system 102 may upload and/or communicate a file comprising spend and/or segment data (e.g., a "spend data file") to a third party system 106 (step 1402). The spend data file may resemble, in part, a model and/or measurement file, as described elsewhere herein. For example, a spend data file may comprise spend and/or segment data associated with one or more customers of a first party system 102, and these data may tied to or associated with each customer by way of a first party cookie ID, as described, in various embodiments, elsewhere herein. However, a spend data file may differ from a model and/or measurement file, in various embodiments, in that a spend data file may not comprise any model data, model information, and/or advertiser information. For example, in various embodiments, a spend data file may not associate a customer and/or a first party cookie ID with a model (but it may still associate a customer and/or first party cookie ID with a segment).

An entity (e.g., a customer or consumer) may visit a website associated with a first party system 102, and as described elsewhere herein, the visit to the first party system website may cause a first party cookie ID and/or a third party cookie ID to be transmitted by a web client associated with the entity to a third party system 106 (step 1404). As described elsewhere herein, a first party cookie ID and/or a third party cookie ID may be stored on an entity's web client in response to a visit to a first party system 102 website (e.g., a web beacon associated with the first party system 102 website may cause these cookie IDs to be stored in response to a visit by the entity to the website). In response to receiving the first party cookie ID and/or the third party cookie ID, the third party system 106 may match or link each id with the other (step 1406). This matching and/or linkage may occur, for example, in a spend data file, so that the spend and/or segment data associated with an entity and/or the entity's first party cookie ID is, as a result of step 1406, also linked to or associated with a third party cookie ID.

As described elsewhere herein, a third party system 106 may link or associate each first party cookie ID and/or each third party cookie ID (e.g., in a spend data file) with clickstream data (e.g., browsing data) associated with an entity (step 1408). For example, as described elsewhere herein, a third party system 106 may receive clickstream data in response to a visit by an entity (e.g., via an entity's web client) to a website. More particularly, and in various embodiments, an entity may visit a website, and a web beacon associated with the website may cause the entity's web client to transmit a first party cookie ID, a second party cookie ID, and/or a third party cookie ID to a second party system 104, which may, in turn, transmit an entity's clickstream data (e.g., in association with the third party cookie ID) to a third party system 106. In response to receiving an entity's clickstream data, a third party system 106 may create a look alike model based on the clickstream data and/or the spend data file (step 1410). Thus, in various embodiments, a first party system 102 may not create and/or provide a model file comprising look alike models. Rather, these may be generated by a third party system 106.

In various embodiments, a third party system 106 may alert and/or instruct a second party system 104 to serve one or more targeted advertisements and/or one or more untargeted advertisements based on a look alike model associated with an entity and/or a browsing behavior of an entity (step 1412). This may occur, as described elsewhere herein, based on one or more targeting logics (e.g., see FIG. 8), which a second party system 104 may use to target advertisements to entities based on the clickstream data associated with those entities. Thus, as described elsewhere herein, a second party system 104 may serve targeted advertisements and/or neutral or untargeted advertisements to entities based upon the clickstream and/or spending data associated with each entity (step 1414). That is, a second party system 104 may serve targeted and/or neutral advertisements based on one or more look alike models and/or browsing activities.

As described herein, system 100 may permit or enable a measurement process, in which the effectiveness of certain advertisements may be calculated. For example, and with continuing reference to FIGS. 14A and 14B, a second party system 104 may transmit both targeted and neutral advertisements to customers who fit particular model logics, and this data may be relayed and/or transmitted (e.g., by a second party system 104 and/or a third party system 106) to a third party system 102 as exposed and/or unexposed data (step 1414). As described elsewhere herein, exposed data may indicate that a customer was exposed to a targeted advertisement, while unexposed data may indicate that a customer was exposed to a neutral advertisement (or not exposed to a targeted advertisement).

However, in various embodiments, and as opposed to certain of the processes described elsewhere herein, a first party system 102 may not transmit a measurement file to a third party system for incorporation of exposed and/or unexposed data. Rather, this data may be transmitted directly to a first party system 102, which may incorporate the data in a measurement file residing on its own systems and/or link and/or associate the data with one or more customers and/or customer first party cookie IDs. In various embodiments, a first party system 102 may receive exposed and/or unexposed data in association with one or more first party cookie IDs, which may identify, to the first party system 102, which customers are represented by and/or associated with each first party cookie ID. Thus, a first party system 102 may associated exposed and/or unexposed data with customers based on one or more first party cookie IDs.

A customer may make one or more purchases based upon the targeted and/or neutral advertisements served to the customer by a second party system 104 (step 1416), and a first party system 102 may track the purchases made by each of its customers over time. Thus, in various embodiments and as described elsewhere herein, a first party system 102 may perform an advertising effectiveness analysis based on spend data and/or exposed and/or unexposed data (step 1418). For example, a first party system 102 may generate a spend report showing a percentage or number of exposed customers who purchased from an advertiser and/or a percentage or number of unexposed customers who purchased from an advertiser. More particularly, in various embodiments, a first party system 102 may compare exposed data to a first spending activity or spending behavior associated with a first customer. A first party system 102 may further compare unexposed data to a second spending activity or spending behavior associated with a second customer. And, based on these comparisons, a first party system 102 may generate a spend report, which may illustrate an effectiveness, as shown, for example, at FIG. 13, of a targeted and/or a neutral advertisement. In various embodiments, a spend report may include demographic information (e.g., a spending report may be organized by demographic information, such as gender, geography, and the like). Moreover, in various embodiments, a spend report may include a spend location, a spending pattern, and/or a spending trend. Further still, in various embodiments, a first party system 102 may update a spend data file based upon exposed and/or unexposed data and/or more recent spend data and re-transmit the updated spend data file to a third party system 104 for continued use (step 1420).

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant may be equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/ typing, iris, retinal or any other biometric relating to recognition based upon any body part, function, system, attribute and/or other characteristic, or any portion thereof.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts or devices, a transponder and reader in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ ECMA-340. Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to "vendor software" or "vendor" may include software, hardware and/or a solution provided from an external vendor (e.g., not part of the merchant) to provide value in the payment process (e.g., risk assessment).

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment;

for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
transmitting, by a spend based targeting computer-based system and to a third party system, a model file associating a first party cookie ID with market segment data;
transmitting, by the computer-based system, the first party cookie ID and a third party cookie ID to a web client associated with a customer, in response to the web client browsing on a website associated with a first party,
receiving, by the computer-based system, an updated model file from the third party system;
associating, by the computer-based system, the updated model file to browsing data; and
determining, by the computer-based system and based on the association, a market segment where the customer at least one of is likely to browse or has recently browsed,
wherein the first party cookie ID identifies the customer with the first party,
wherein the first party cookie ID is associated with a model,
wherein the model associates the market segment of interest to the customer with the first party cookie ID,
wherein the customer is associated with the market segment based on the spend data of the customer,
wherein the third party system associates the third party cookie ID with the model file and the first party cookie ID,
wherein the web client transmits the first party cookie ID and the third party cookie ID to the third party system in association with web browsing data,
wherein a second party system provides a second party cookie ID to the web client,
wherein the second party system transmits the browsing data to the third party system,
wherein the browsing data is associated with at least one of the web client or the third party cookie ID,
wherein the third party system updates a model file such that the browsing data is associated with the third party cookie ID,
wherein the model file includes the market segment of interest to the customer,
wherein the model file identifies other customers interested in the market segment,
wherein the third party system deletes the first party cookie ID from the updated model file,
wherein the first party is unable to identify the customer without the first party cookie ID,
wherein the third party is unable to associate the browsing data with the customer, and
wherein the third party system transmits the updated model file to the first party system.

2. The method of claim 1, wherein the third party system matches the third party cookie ID with the first party cookie ID in the model file.

3. The method of claim 1, wherein the model file associates a customer with a segment.

4. The method of claim 1, wherein the determining results in a look alike targeting model.

5. The method of claim 1, wherein the third party system receives the browsing data from a second party system in association with the third party cookie ID.

6. The method of claim 1, wherein the second party system serves targeted advertisements to the web client based on the updated model.

7. The method of claim 1, wherein the first party cookie ID is deleted from the browsing data.

8. A system comprising:
a spend based targeting processor;
a tangible, non-transitory memory communicating with the processor,
the tangible, non-transitory memory having instructions stored thereon that, in response to execution by the processor, cause the processor to perform operations comprising:
transmitting, by the processor and to a third party system, a model file associating a first party cookie ID with market segment data;
transmitting, by the processor, the first party cookie ID and a third party cookie ID to a web client associated with a customer, in response to the web client browsing on a website associated with a first party,
receiving, by the processor, an updated model file from the third party system;
associating, by the processor, the updated model file to browsing data; and
determining, by the processor, and based on the association, a market segment where the customer at least one of is likely to browse or has recently browsed,
wherein the first party cookie ID identifies the customer with the first party,
wherein the first party cookie ID is associated with a model,
wherein the model associates the market segment of interest to the customer with the first party cookie ID,
wherein the customer is associated with the market segment based on the spend data of the customer,
wherein the third party system associates the third party cookie ID with the model file and the first party cookie ID,
wherein the web client transmits the first party cookie ID and the third party cookie ID to the third party system in association with web browsing data,
wherein a second party system provides a second party cookie ID to the web client,
wherein the second party system transmits the browsing data to the third party system,
wherein the browsing data is associated with at least one of the web client or the third party cookie ID, wherein the third party system updates a model file such that the browsing data is associated with the third party cookie ID, wherein the model file includes the market segment of interest to the customer, wherein the model file identifies other customers interested in the market segment, wherein the third party system deletes the first party cookie ID from the updated model file, wherein the first party is unable to identify the customer without the first party cookie ID, wherein the third party is unable to associate the browsing data with the customer, and wherein the third party system transmits the updated model file to the first party system.

9. The system of claim 8, wherein the third party system matches the third party cookie ID with the first party cookie ID in the model file.

10. The system of claim 8, wherein the model file associates a customer with a segment.

11. The system of claim 8, wherein the determining results in a look alike targeting model.

12. The system of claim 8, wherein the third party system receives the browsing data from a second party system in association with the third party cookie ID.

13. The system of claim 8, wherein the second party system serves targeted advertisements to the web client based on the updated model.

14. The system of claim 8, wherein the first party cookie ID is deleted from the browsing data.

15. An article of manufacture including a non-transitory, tangible computer readable storage medium having instructions stored thereon that, in response to execution by a spend based targeting computer-based system, cause the computer-based system to perform operations comprising:

transmitting, by the computer-based system and to a third party system, a model file associating a first party cookie ID with market segment data;

transmitting, by the computer-based system, the first party cookie ID and a third party cookie ID to a web client associated with a customer, in response to the web client browsing on a website associated with a first party, receiving, by the computer-based system, an updated model file from the third party system;

associating, by the computer-based system, the updated model file to browsing data; and determining, by the computer-based system and based on the association, a market segment where the customer at least one of is likely to browse or has recently browsed, wherein the first party cookie ID identifies the customer with the first party, wherein the first party cookie ID is associated with a model, wherein the model associates the market segment of interest to the customer with the first party cookie ID, wherein the customer is associated with the market segment based on the spend data of the customer, wherein the third party system associates the third party cookie ID with the model file and the first party cookie ID, wherein the web client transmits the first party cookie ID and the third party cookie ID to the third party system in association with web browsing data, wherein a second party system provides a second party cookie ID to the web client, wherein the second party system transmits the browsing data to the third party system, wherein the browsing data is associated with at least one of the web client or the third party cookie ID, wherein the third party system updates a model file such that the browsing data is associated with the third party cookie ID, wherein the model file includes the market segment of interest to the customer, wherein the model file identifies other customers interested in the market segment, wherein the third party system deletes the first party cookie ID from the updated model file, wherein the first party is unable to identify the customer without the first party cookie ID, wherein the third party is unable to associate the browsing data with the customer, and wherein the third party system transmits the updated model file to the first party system.

16. The article of claim 15, wherein the third party system matches the third party cookie ID with the first party cookie ID in the model file.

17. The article of claim 15, wherein the model file associates a customer with a segment.

18. The method of claim 1, further comprising:

assigning, by the computer-based system and based on a model file, a model to an advertiser, wherein a segment of the customer defines the model;

translating, by the computer-based system and based on browsing behavior of the customer, the segment of the model into targeting logics;

wherein the targeting logics comprise a look alike model, and wherein the targeting logics are used to track browsing activity of the customer, and wherein a targeted advertisement is transmitted to the customer, in response to the browsing activity satisfying criteria associated with the targeting logics.

19. The method of claim 18, wherein the translating comprises translating the segment of the customer into a Boolean string.

20. The method of claim 18, further comprising transmitting, by the computer-based system, the targeting logics to a second party system, and wherein the second party system transmits the targeted advertisement to the customer, based on the model assigned to the advertiser.

21. The method of claim 18, further comprising:

validating, by the computer-based system, the model;

scoring, by the computer-based system, the model; and ranking, by the computer-based system, the model.

* * * * *